US006012087A

United States Patent [19]
Freivald et al.

[11] Patent Number: 6,012,087
[45] Date of Patent: Jan. 4, 2000

[54] UNIQUE-CHANGE DETECTION OF DYNAMIC WEB PAGES USING HISTORY TABLES OF SIGNATURES

[75] Inventors: Matthew P. Freivald, Sunnyvale; Alan C. Noble, Santa Cruz, both of Calif.

[73] Assignee: NetMind Technologies, Inc., Cambell, Calif.

[21] Appl. No.: 09/081,991

[22] Filed: May 20, 1998

Related U.S. Application Data

[63] Continuation-in-part of application No. 08/783,625, Jan. 14, 1997, Pat. No. 5,898,836.
[51] Int. Cl.[7] .................................................. H04L 12/00
[52] U.S. Cl. ........................ 709/218; 709/229; 709/201
[58] Field of Search .................................. 709/218, 229, 709/224, 226, 201; 395/705; 380/21, 25, 29, 4; 705/8

[56] References Cited

U.S. PATENT DOCUMENTS

| | | | |
|---|---|---|---|
| 5,109,486 | 4/1992 | Seymour | 709/224 |
| 5,204,897 | 4/1993 | Wyman | 380/4 |
| 5,249,261 | 9/1993 | Natarajan | 706/46 |
| 5,260,999 | 11/1993 | Wyman | 380/4 |
| 5,438,508 | 8/1995 | Wyman | 705/8 |
| 5,574,906 | 11/1996 | Morris | 707/1 |
| 5,596,750 | 1/1997 | Li et al. | 709/101 |
| 5,666,502 | 9/1997 | Capps | 345/352 |
| 5,671,282 | 9/1997 | Wolff et al. | 380/25 |
| 5,715,453 | 2/1998 | Stewart | 707/104 |
| 5,835,726 | 11/1998 | Shwed et al. | 709/229 |
| 5,898,836 | 4/1999 | Freivald | 709/218 |
| 5,923,880 | 7/1999 | Rose et al. | 395/705 |

*Primary Examiner*—Zarni Maung
*Assistant Examiner*—Khanh Quang Dinh
*Attorney, Agent, or Firm*—Stuart T. Auvinen

[57] ABSTRACT

An improved change-detection tool detects only relevant changes within Internet web pages on the world-wide-web. Changes back to an earlier version of a web page are not relevant and do not cause the user to be notified. Only changes to a new, unique version of the web page generate a user notification. After the user finishes registering the web page by specifying the URL and the user's e-mail address, the change-detection tool periodically retrieves the webpage at the specified URL and generates a checksum or signature to determine when to send a notification to the user. Signatures from several older versions of the web page are stored in a history table. When a new signature for a re-fetched page matches the most-recent signature at the top of the stack in the history table, no change has occurred. When the new signature matched any of the older signatures in the history table, the detected change is not unique and notification is not made even though a change has occurred. When the new signature matches one of the older, not-most-recent signatures in the history table, the signature is moved into a permanent history table. Signatures in the permanent history table are for recurring versions of the web page and are likely to appear again. Error pages displayed when a web server is down for routine maintenance can be screened out using the history table. The frequency of notifications is tracked. When too many notifications are being sent for a web page, the last-modified header is used rather than signature-matching to reduce the frequency of notifications.

20 Claims, 14 Drawing Sheets

37 C.F.R. RULES

37 C.F.R. 1.8    APPLICANT SHALL ....

37 C.F.R. 1.62    A CONTINUATION ....

37 C.F.R. 1.136    AN EXTENSION OF....

DOC SIGNATURE = 5A7

FIG. 1

37 C.F.R. RULES

37 C.F.R. 1.8    APPLICANT SHALL ....

37 C.F.R. 1.62    DELETED RULE

37 C.F.R. 1.136    AN EXTENSION OF....

(MODIFIED RULE)

DOC SIGNATURE = D6F
CHANGE DETECTED

FIG. 2

DOC SIGNATURE = EB9

CHANGE DETECTED
IS NOT RELEVENT

```
<HTML>
<CONTENT_LEN = 37,428>
<LAST_MODIFIED = 3.15.98 13:42>

HWP   63 1/4  + 3        15
         INTC  62 3/4  - 12 1/2

<END_HTML>
```

UNIQUE-CHANGE DETECTION OF DYNAMIC WEB PAGES USING HISTORY TABLES OF SIGNATURES

RELATED APPLICATION

This application is a continuation-in-part of the application for "Change-Detection Tool Indicating Degree and Location of Change of Internet Documents by Comparison of CRC Signatures", U.S. Ser. No. 08/783,625, filed Jan. 14, 1997 now U.S. Pat. No. 5,898,836.

FIELD OF THE INVENTION

This invention relates to software retrieval tools for networks, and more particularly to improved accuracy for a change-detection tool for the Internet.

BACKGROUND OF THE INVENTION

Fast, inexpensive distribution of information has been promoted by the widespread acceptance of the Internet and especially the world-wide-web (www). This information can be easily updated or changed. However, users may not be aware of the changes. Unless the user frequently re-reads the information, many days or weeks may pass before users realize that the information has changed.

Documents on the web are known as web pages. These web pages are frequently changed. Users often wish to know when changes are made to certain web pages. The parent application disclosed a change-detection tool that allows users to register web pages. Each registered web page is periodically fetched and compared to a stored checksum or signature for the registered page to determine if a change has occurred. When a change is detected, the user is notified by e-mail. The change-detection tool of the parent application allows user to select portions of a web-page document for change detection while other portions are ignored.

Such a change-detection tool as described in detail in the parent application is indeed useful and has gained popularity with Internet users, as several hundred thousand web pages have been registered. For example, patent professionals can register the federal regulations and procedures (37 C.F.R. and the M.P.E.P) posted at the PTO's web site and be notified when any changes are made. The change-detection tool is currently free for public use at the www.netmind.com web site.

FIG. 1 illustrates a web page registered for change detection. This web page contains a copy of one or more of the code of federal regulations; specifically the patent office regulations at 37 C.F.R § 1.x. A patent attorney registers this web page that contains a copy of the patent rules at 37 C.F.R. § 1.8 to 1.136. The rules may be located on one large web page, or spread across many web pages that are each registered.

The user registers this page by using a user-interface for the change-detection tool. The user enters his e-mail address and the URL for the web page. The change-detection tool fetches a copy of this page and generates a signature. The signature is a highly-condensed data word that is produced by using a cyclical-redundancy-check (CRC) or other algorithm that produces unique outputs. For the initial page of FIG. 1, the signature 5A7 (hex) is generated and stored in a database with the user's e-mail address and the web page's URL.

The change-detection tool periodically fetches this web page to see if a change has occurred. A new signature is generated for the re-fetched page, and the new signature is compared with the old signature stored in the database. A mismatch indicates that a change is detected.

FIG. 2 shows an updated web page that has a different signature that triggers a change notification. Occasionally, the patent regulations are updated. Web pages containing a copy of these regulations are eventually updated to reflect the changed rules. For example, FIG. 2 shows that rule 37 C.F.R. § 1.62 has been deleted while rule 37 C.F.R. § 1.136 has been updated, as they were in late 1997.

The change detection tool re-fetches each registered page every few hours or days. Once the rules on the web page are updated, a different signature is generated for the updated web page. In FIG. 2, the new signature of D6F is generated, which does not match the old signature of 5A7 stored in the change-detection tool's database. Thus a change is detected. The new signature is stored in the database and the patent attorney user is notified by e-mail.

The user is notified within a few days after the web page is updated, allowing the patent attorney to rest easy, not having to frequently surf over to the rules page to see if any changes have been made.

False Change Detections—FIG. 3

The change-detection tool is only useful when it saves time and effort for the user. One problem is that false notifications can be made, annoying the user with changes that are not relevant. The inventors have discovered that the world-wide-web itself can trigger false change detections. These false detections should be filtered out.

FIG. 3 shows a false change detection caused by a non-relevant change in an Internet server. Web pages are stored on computer servers. These servers are sometimes disconnected from the Internet for maintenance such as program or hardware updates, or security threats such as hacker attacks.

The web server containing the web page with the 37 C.F.R. patent rules is disconnected from the Internet for maintenance. Often such maintenance occurs during low-usage times such as weekend nights. Most users do not notice that the web pages are offline during these hours. Unfortunately, automated software programs such as the change-detection tool continue to operate during these times, and may perform more fetching during off hours since network response times decrease. The change-detection tool may find that the web page is not available.

When no connection can be made with the server, the change-detection tool can simply skip the web page until a later time. Since TCP/IP packets are not returned from the server, the change-detection tool can easily determine that the page is not available due to a network problem. The change-detection tool does not notify the user, but instead tries again later.

Completely disconnecting servers from the Internet is frowned upon since users do not know what is causing the errors. Thus many web sites use another server to return a message page to the user when the server is down for maintenance. This message or error page lets the user know that the web page is only temporarily unavailable and the user should try back later.

The error page of FIG. 3 is returned when a user tries to retrieve the web page containing the 37 C.F.R. patent rules. This same error page is returned to change-detection software trying to fetch the web page. However, since no packet or network error is signaled, the change-detection tool assumes that the error page is the registered web page and generates a new signature. The new signature for the error page is EB9, which does not match the old signature (D6F) that was stored in the database after the last change was detected.

The change-detection tool then generates a change notice that is emailed to the user. The next day when the patent attorney reads the change notice, he browses over to the web page. By now the server is back up, showing the same web page as in FIG. 2. Although the user reads the web page carefully, he cannot find any changes.

A few days later, the change detection tool again retrieves the web page and generates the new signature. Since this new signature does not match the error page's signature that was stored, another change notice is generated. The user again looks at the web page but finds no changes. At this point, after receiving to false change notices, the user cancels his change-detection service to avoid getting the false notifications.

HTML Headers—FIG. 4

FIG. 4 shows a dynamic web page with HTML headers. A content-length HTML header <CONTENT_LEN> specifies the length of the web-page document in bytes. A last-modified header <LAST_MODIFIED> contains a date and time of the last modification of the web page. Dynamic content 15 is frequently updated, often by a database or search-engine server. Stock quotes are an example of dynamic content that appears in a dynamic frame. Dynamic images or JAVA programs are often used as dynamic content.

Some change-detection software relies solely on the last-modified header in the HTTP response from a Web server. For example, Microsoft Internet Explorer 4.0 has a feature called "Subscriptions" under the "Favorites" menu, which detects changes in web pages. This feature relies on the last-modified header to determine when a web page has changed. Unfortunately, many web pages do not return a last-modified header, and Internet Explorer generates false change notifications each time it checks a web page lacking the last-modified header.

Not all documents contain a last-modified header. The last-modified header may or may not reflect changes in dynamic content 15. Some web servers update the last-modified header only when the static content changes. Thus change notifications are not generated when the dynamic content changes. This may be undesirable when the dynamic content is what the user desires to have checked. For example, when the user wants to search newsgroups for the appearance of a specific product or company name, the result of the search is dynamic content. If the web server does not return a Last-Modified header, the user is notified by an unsophisticated change-detection tool every time the search result is checked. If the web server returns a Last-Modified header based only on the static content, the user is not notified when the results of the search—the dynamic content—changes.

The last-modified header may also be updated when the HTML header are changed, but not the visible document. This can also cause false changes to be reported. Even if the change detection tool is intelligent enough to analyze the content for changes, rather than relying solely on the Last-Modified header, false changes can be reported when the server returns only a portion of the web page due to some kind of error. The inventors, with the benefit of the experience involved in running a change detection tool for hundreds of thousands of different documents on the Internet, have recognized these problems. Without this level of experience these problems are not easily recognized.

What is desired is an improved automated change-detection tool that detects when changes occur to a registered document on the Internet. It is desired that the user not have to check the web page to see if any changes have occurred. A change-detection tool adapted to filter out false change notifications desired. A change-detection tool that does not report changes that are not relevant to the user is desirable. Identification of temporary error pages is desirable so that they are not reported to the user. A more sophisticated and more robust change-detection tool is desired.

SUMMARY OF THE INVENTION

A change-detection web server detects unique changes in web pages. A network connection transmits and receives packets from a remote client and a remote web-page server. A responder is coupled to the network connection. It communicates with the remote client. The responder registers a web page for change detection by receiving from the remote client a uniform-resource-locator (URL) identifying the web page. The responder fetches the web page from the remote web-page server.

A database is coupled to the responder. It receives the URL from the responder when the web page is registered by the remote client. The database stores a plurality of records each containing a URL.

A history table in each of the records in the database stores a most-recent signature and a plurality of older-version signatures for a registered web page identified by the URL. The older-version signatures are condensed checksums for earlier versions of the registered web page previously fetched by the change-detection web server. The most-recent signature is a condensed checksum for a most-recently-fetched copy of the registered web page. A periodic minder is coupled to the database and the network connection. It periodically re-fetches the web page from the remote web-page server by transmitting the URL from the database to the network connection. The periodic minder receives a fresh copy of the web page from the remote web-page server. The periodic minder generates a new signature from the fresh copy of the web page. The periodic minder notifies the remote client of a unique change when the new signature does not match the most-recent signature and does not match any of the older-version signatures in the record.

Thus the unique change in the web page is detected by comparing the new signature to the most-recent signature and to older-version signatures for the web page. Changes in the web page that are not unique but match an earlier version of the web page do not notify the remote client.

In further aspects the database does not store the web page. The database stores the most-recent signature and earlier-version signatures for the web page. Thus storage requirements for the database are reduced by archiving the most-recent signature and not entire web pages.

In still further aspects a permanent history table stores new signatures that match one of the older-version signatures. Thus older-version signatures that are matched are copied to the permanent history table.

In other aspects the history table is a temporary history table organized as a first-in-first-out stack. A least-recent signature in the history table is replaced by a new signature when notification is made. Thus signatures in the permanent history table are not deleted by new signatures written to the temporary history table.

In further aspects the older-version signatures are stored in both the permanent history table and the history table. The periodic minder compares the new signature to older-version signatures from both the history table and from the permanent history table.

BRIEF DESCRIPTION OF THE DRAWINGS

FIG. 1 illustrates a web page registered for change detection.

FIG. 2 shows an updated web page that has a different signature that triggers a change notification.

FIG. 10 shows a history table with both temporary and permanent signatures.

FIG. 11 illustrates how the permanent history table is loaded for detected changes when any of the older signatures in the temporary history table are matched.

DETAILED DESCRIPTION

The present invention relates to an improvement in change-detection software tools. The following description is presented to enable one of ordinary skill in the art to make and use the invention as provided in the context of a particular application and its requirements. Various modifications to the preferred embodiment will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed.

Figure 5:
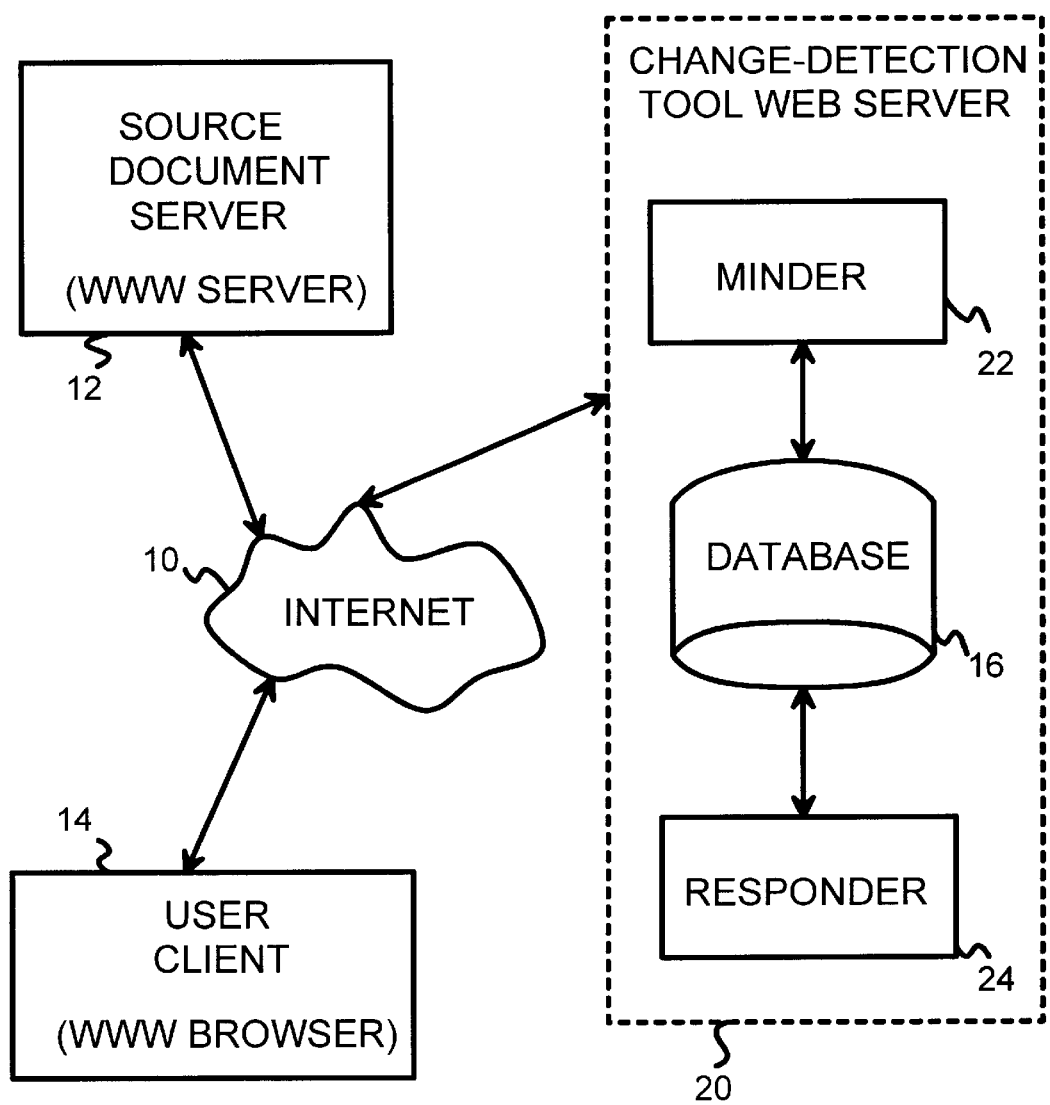
FIG. 5 is a diagram of a change detection tool on a server on the Internet.

Overview of Change-detection Web Server—FIG. 5

FIG. 5 is a diagram of a change detection tool on a server on the Internet. The user operates client 14 from a remote site on Internet 10. The user typically is operating a browser application, such as Netscape's Navigator or Microsoft's Internet Explorer, or a browser mini-application such as an Internet toolbar in a larger program. Client 14 communicates through Internet 10 by sending and receiving TCP/IP packets to establish connections with remote servers, typically using the hypertext transfer protocol (HTTP) of the world-wide web.

Client 14 retrieves web pages of files from document server 12 through Internet 10. These web pages are identified by a unique URL (uniform resource locator) which specifies a document file containing the text and graphics of a desired web page. Often additional files are retrieved when a document is retrieved. The "document" returned from document server 12 to client 14 is thus a composite document composed of several files of text, graphics, and perhaps sound or animation. The physical appearance of the web page on the user's browser on client 14 is specified by layout information embedded in non-displayed headers, as is well-known for HTML (hyper-text markup language) documents. Often these HTML documents contain headers with URL's that specify other web pages, perhaps on other web servers which may be physically located in different cities or countries. These headers create hyper-links to these other web servers allowing the user to quickly jump to other servers. These hyper-links form a complex web of linked servers across the world; hence the name "world-wide web".

The user may frequently retrieve files from remote document server 12. Often the same file is retrieved. The user may only be interested in differences in the file, or learning when the file is updated, such as when a new product or service is announced. The inventors have developed a software tool that automatically retrieves files and compares the retrieved files to an archived signature of the file to determine if a change in the file has occurred. When a change is detected, the user is notified by an electronic mail message (e-mail). A copy of the new file may be attached to the e-mail notification, allowing the user to review the changes.

Rather than archive the source files from remote document server 12, the invention archives a checksum CRC or signature of the source files. These signatures and the e-mail address of the user are stored in database 16 of change-detection server 20. Comparison is made of the stored or archived signature of the document and a fresh signature of the currently-available document. The signature is a condensed checksum or fingerprint of the document. Any change to the document changes the signature.

Change-detection server 20 performs three basic functions:

1. Register (setup) a web page document for change detection.
2. Periodically re-fetch the document and compare for changes
3. E-mail a change notice to the registered user if a change is detected.

Change-detection server 20 contains three basic components. Database 16 stores the archive of signatures for registered web-page documents. The URL identifying the web page and the user's e-mail address are also stored with the archived signature. Responder 24 communicates with the user at client 14 to setup or register a web page document for change detection. Minder 22 periodically fetches registered documents from document server 12 through Internet 10. Minder 22 compares the archived signature in database 16 to a new signature of the fetched document to determine if a change has occurred. When a change is detected, minder 22 sends a notice to the user at client 14 that the document has changed.

Change-Detection of Web Pages

This change-detection tool is disclosed in the co-pending parent application, "Change-Detection Tool Indicating Degree and Location of Change of Internet Documents by Comparison of CRC Signatures", U.S. Ser. No. 08/783,625, filed Jan. 14, 1997, hereby incorporated by reference. A basic change-detection tool without the improved methods using the signature history tables has been available for free public use at the inventor's web site, www.netmind.com, for more than a year before the filing date of the present application. The existing "URL-minder" has over 700,000 documents or URL's registered for 3.8 million users.

Unique-content, not Mere Change, is Detected

The inventors have realized that change detection must be accurate to be useful. False change detections must be avoided and non-relevant changes ignored. Often, the user does not want to be notified of all changes, but rather only for new content. Thus the inventors notify the user when "unique" content is detected; not when a mere "change" to old content is detected.

Rather than just store the last signature, the inventors use a table of several older signatures. When any of the older signatures match the web page, the content is not unique even if it has changed since the last check. The web page may have reverted back to an older version.

Previous change-detection tools generate notifications for any change, including changes back to an older version. With the improvement, the user is not notified for the older-version change, even though the web page has changed. It is likely that the user has already seen the older version of the web page. Only unique web pages that are unlike any previous versions cause the user to be notified. Thus the improved invention is not a "change"-detection tool, but a "Unique-content" tool.

Figure 6:
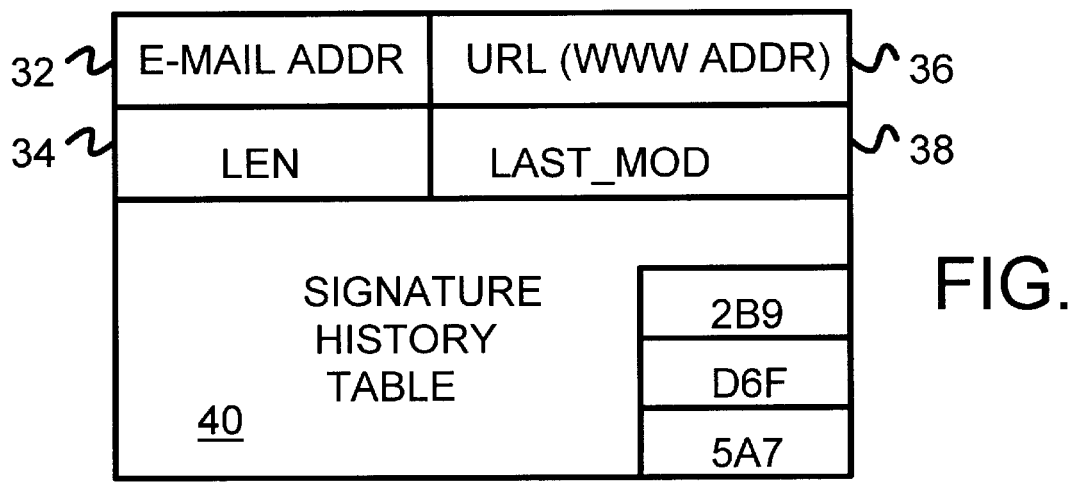
FIG. 6 shows a record with a history table of past signatures in the database for the change-detection web server.

Database Records Include History Table of Signatures—FIG. 6

FIG. 6 shows a record with a history table of past signatures in the database for the change-detection web server. Database 16 of FIG. 5 contains many such records, one for each web page or URL. Multiple e-mail addresses can be stored for each web page by using a relational (multi-table) database, with a separate table linking e-mail addresses to registered web pages.

Each record has one or more e-mail address 32. When a unique change is detected, a notification message is sent to e-mail address 32. URL 36 is the world-wide-web address that is used to locate the web page. This URL is translated to an IP address of a server machine by Internet directories when the page is fetched. Length field 34 stores the length of the web page and can be used to ensure that the entire web page has been fetched.

Last-modified field 38 contains a copy of the last-modified header from the web server for the particular web-page. Although the change-detection tool is primarily signature-based, improved detection results when the last-modified header in the newly-fetched document is compared to last-modified field 38.

Rather than store one signature for the most-recent version of the web page, a table of signatures for many older versions of the web page is stored. History table 40 contains signatures for the three most-recent versions of the web page. Signature 2B9 (hex) is the most-recent signature for the web page, and the change-detection tool of the parent application stores only this signature, or multiple signatures for each section of this one most-recent version of the web page.

History table 40 also stores signature D6F, for the next-to-last version of the web page, and signature 5A7 for the next earlier version of the web page. Thus three signatures for the last three versions of the web page are stored in history table 40. If a newly-fetched web page changes to any of the two earlier versions, a notification is not made, even though a change occurred.

The number of signatures stored in history table 40 can vary; the three signatures of FIG. 6 is just for illustration. The size of history table 40 does not have to be fixed; it can vary under software control according to available storage in the database. The size of history table 40 could be adjusted to store all signatures in the last month or year rather than a fixed number of signatures.

History Table Stores Signatures for Older Versions of Web Page—FIG. 7

Figures 3, 4:
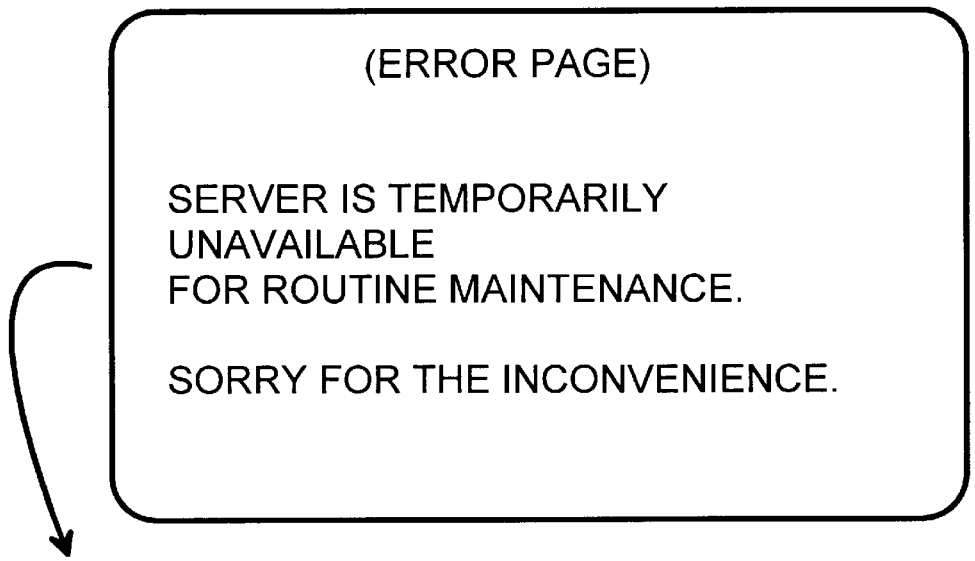
FIG. 3 shows a false change detection caused by a non-relevant change in an Internet server.
FIG. 4 shows a dynamic web page with HTML headers.

Notifying for unique content, rather than just for any change, solves the problem highlighted in FIGS. 1–3. The error page of FIG. 3 is an "older version" of the web page, since it is presented to users whenever the server is down for maintenance. The signature for this error page is stored in the history table. Every time the server is down and the error page fetched, the change-detection server does not notify the user of the change, since the error page is not unique. Likewise, when the server comes back up and the normal page (FIG. 2) is again presented, notification is not made since its signature is also stored in the history table as for one of the older versions of the web page.

Figure 7A:
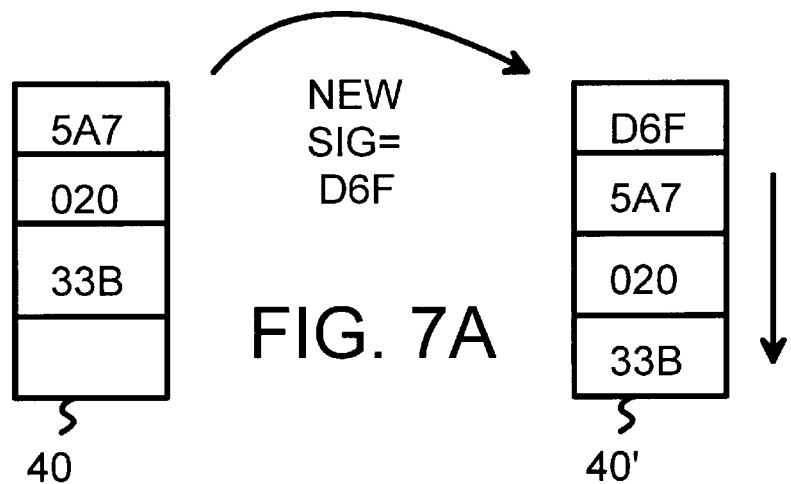
FIGS. 7A–7D illustrate how a history table of signatures solves the error-page problem of FIGS. 1–3.

FIGS. 7A–7D illustrate how a history table of signatures solves the error-page problem of FIGS. 1–3. In FIG. 7A, history table 40 contains three signatures 5A7, 020, 33B for three previous versions of the registered web page. The most recent version of the web page, shown in FIG. 1, has a signature of 5A7, which is stored at the top of history table 40. History table 40 is organized as a first-in-first-out FIFO memory or stack.

When the web page is re-fetched by the minder, a change is detected. The web page has changed to the version shown in FIG. 2, and has the signature D6F. Change is detected by the change-detection tool since the new signature D6F does not match the last signature 5A7. Furthermore, the new signature does not match any of the signatures of older-versions of the web page, such as 020 and 33B that are also stored in history table 40. Thus the new web page is not merely a change, but it is a unique change. Notification is therefore sent to the user.

The new signature D6F is loaded into history table 40 at the top of the stack. When a new signature is stored in history table 40, the oldest signature is deleted to make room, and all other signatures are shifted down to make room for the new signature at the top of the stack. Of course, pointers are used for the top of the stack rather than physically move the signatures. Since history table 40 is not yet full, the older signatures are simply moved down and none are deleted, as shown for updated history table 40'.

Figure 7B:
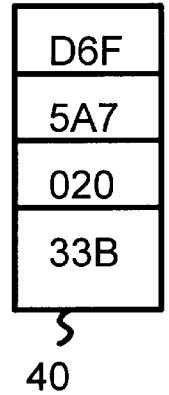
Figure 7B:
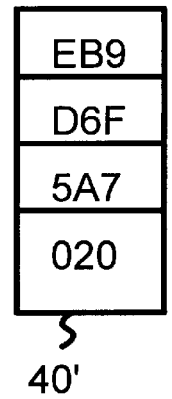

Notification for First Occurrence of Error Page—FIG. 7B

In FIG. 7B, the error page of FIG. 3 is fetched by the change-detection software. The new signature for the error page is EB9. Since signature EB9 does not match any previous signatures in history table 40, notification is made. The new signature EB9 is loaded to the top of history table 40, and the oldest signature 33B is deleted to make updated history table 40'.

The user may be somewhat annoyed at getting this notification. The error page of FIG. 3 is replaced by the normal page of FIG. 2 by the time the user reads the message the next morning, when the server is back up. Thus the user cannot detect any change. However, with the history table only the first occurrence of the error page generates the notification. Users often can forgive one false notification but after three false notices they may be angry enough to cancel the service.

Figure 7C:
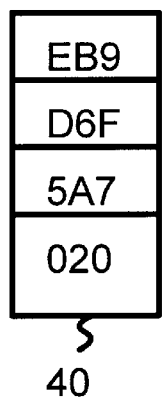
Figure 7C:
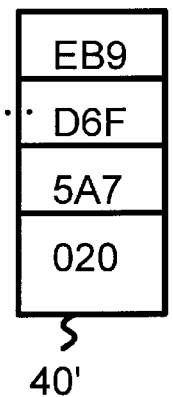

Notification Avoided when Server Comes Back Up—FIG. 7C

Continuing in FIG. 7C, the signature for the fetched web page changes when the server comes back up after server maintenance is completed. After the server comes back up, the normal page of FIG. 2 is returned. When the change-detection tool fetches the web page, the new signature is D6F. Since signature D6F is already in history table 40, notification is not made. A change is detected, since signature D6F does not match the most-recent signature at the top of history table 40, signature EB9 for the error page. However, the change is not unique since the new signature matches one of the older signatures in history table 40. Notification is not made. Since the new signature D6F is already in history table 40, no change needs to be made to history table 40, although the new signature D6F could be moved to the top (not shown).

Figure 7D:
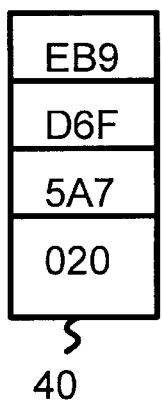
Figure 7D:
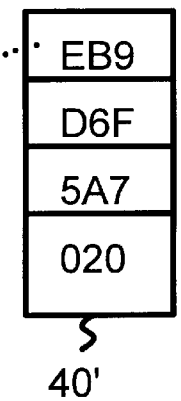

Notification Avoided for Next Error Page—FIG. 7D

Continuing in FIG. 7D, the server again goes down for routine maintenance, and the error page of FIG. 3 is returned anytime the normal web page's URL is requested. The signature EB9 for the error page matches an older signature in history table 40, so notification is not made. Even though a change has occurred, notification is not made because the change is not unique; the error page has occurred before.

The error page is not detectable by the TCP/IP stack, since it appears to low-level software as a normal web page sent using normal IP packets. Web-browser software may be able to detect an HTTP error, but not always. The improved change-detection tool can detect this error page since it is not unique—the error page has occurred before. When the server comes back up, the normal page is also detected as non-unique, so notification is again avoided. Each subsequent time the server goes down and the error page is displayed, the improvement using the history table can avoid two non-relevant notifications. Only the first occurrence of the error page generates a non-relevant notification, so the user only sees one mistaken notification.

Figure 8A:
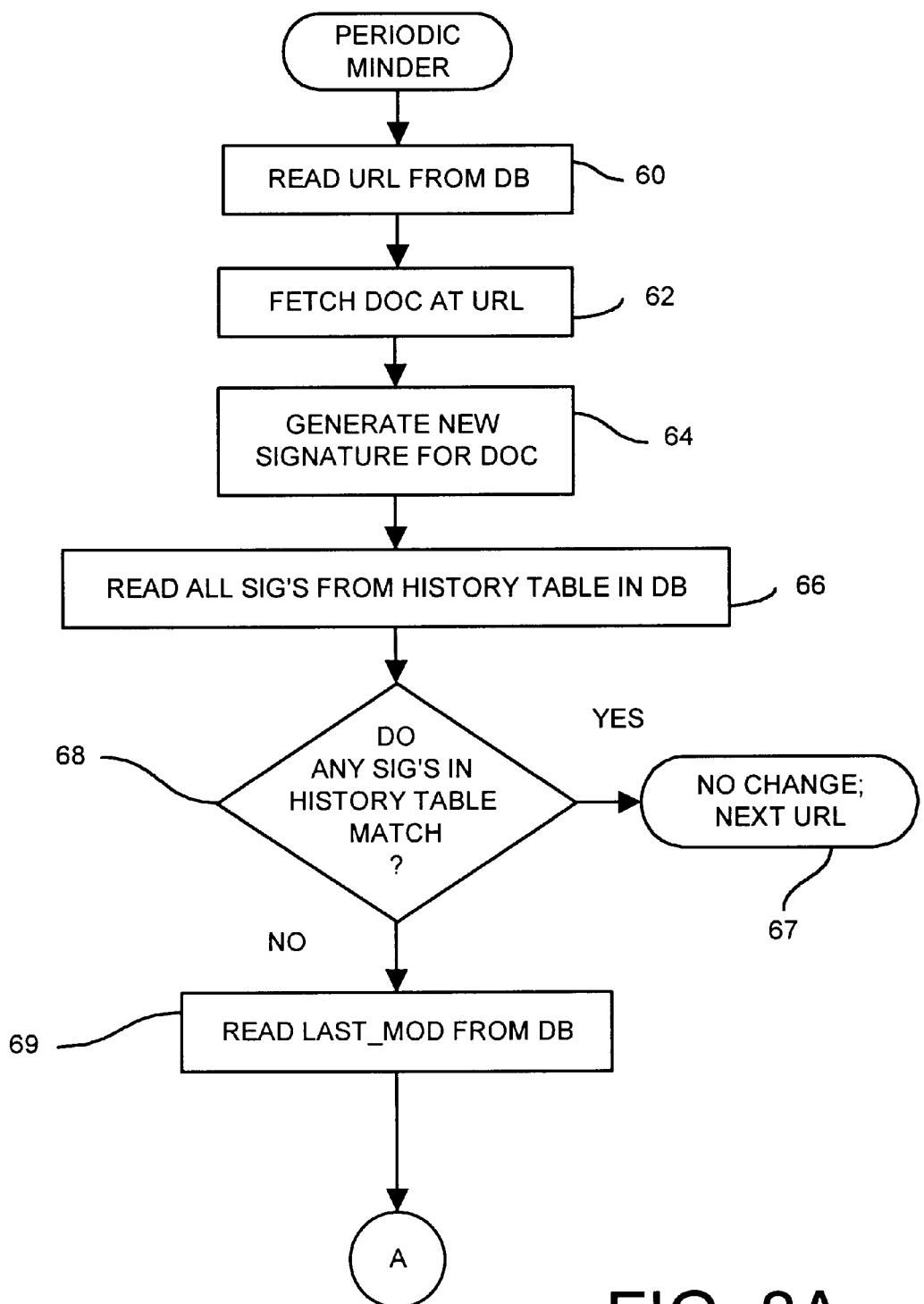
FIGS. 8A, 8B are a flowchart for the periodic minder using history tables and last-modified headers to avoid non-relevant change notifications.
Figure 8B:
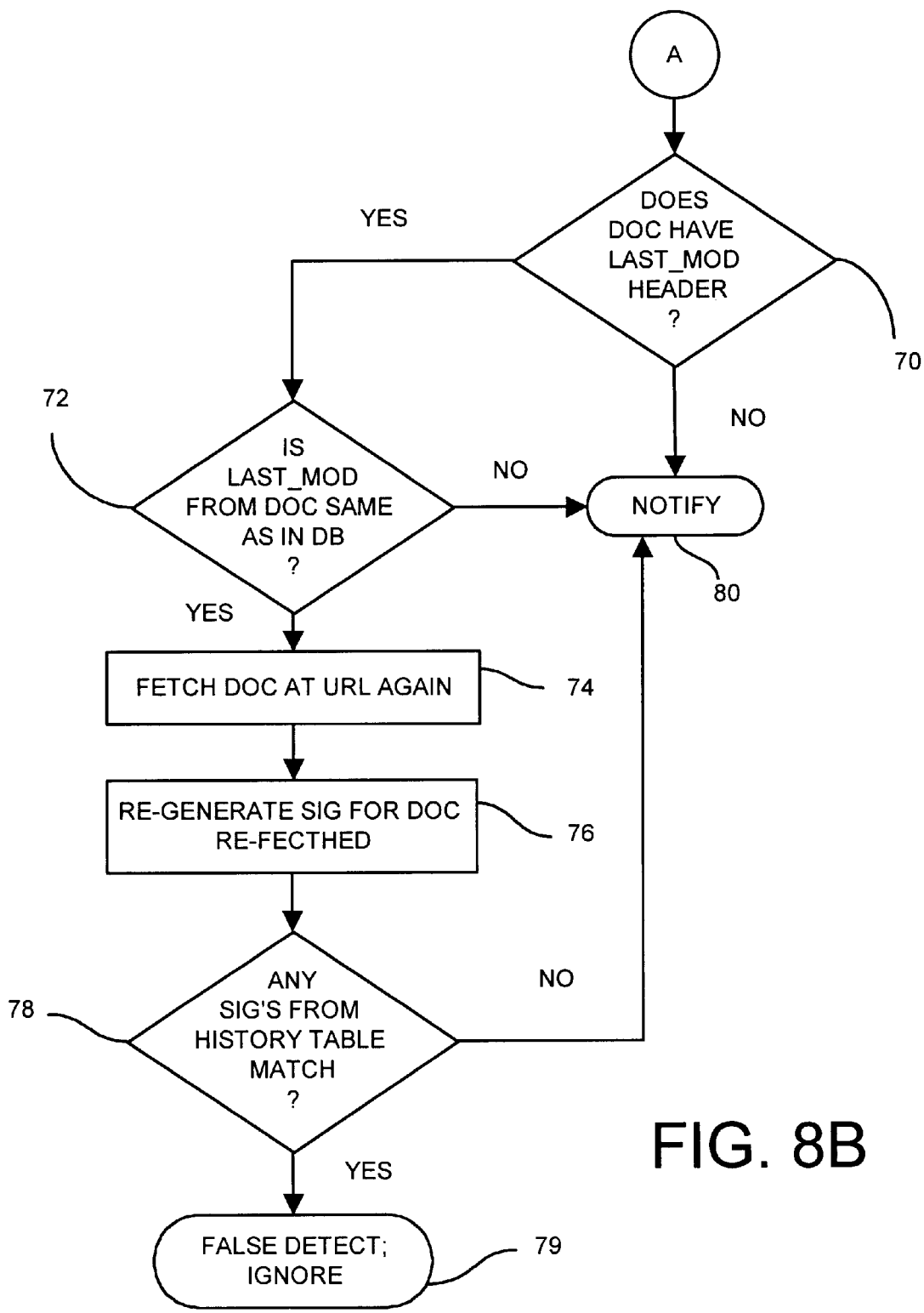

Periodic Minder using History Table—FIGS. 8A, 8B

FIGS. 8A, 8B are a flowchart for the periodic minder using history tables and last-modified headers to avoid non-relevant change notifications. Periodic minder 22 of FIG. 5 is the software module of the change-detection tool that periodically re-fetches each registered web page, generates the new signature, and compares it to old signatures in a history table stored in the database. Periodic minder 22 also generates an e-mail message to notify the user when a unique change is detected.

When the periodic minder completes one web page or URL, it moves to the next URL in its database. The URL is read from the next record, step 60. This URL is sent out to the Internet with a request to retrieve the web-page document pointed to by the URL, step 62. Once the document is retrieved, a condensed checksum or new signature for the document is generated, step 64.

Since this new signature is to be compared to all the old signatures in the history table, these old signatures are read from the current record's history table, step 66. In step 68, the new signature is compared to each of the old signatures to detect any matches. If a match is found, then the new signature is not unique and no change notification is made. The periodic minder moves on to the next record and URL, step 67.

When none of the old signatures from the history table matches the new signature, then a change may have been detected. Some additional checking is performed to make sure that the change is relevant, and that some type of network error has not caused a false detection.

Last-Modified Header Used to Double-Check Detection—FIG. 8B

The last-modified field for the URL record is read from the database, step 69. Continuing to FIG. 8B, the web-page document is parsed for a last-modified header in the HTML header. If no last-modified header is found, step 70, then notification is made, step 80. When the web server returns a last-modified header, then an additional check can be performed.

In step 72, the last-modified header from the document is compared to the last-modified field stored in the database. When these date-stamps do not match, both the last-modified date and the signatures indicate a change and notification is made, step 80. When the last-modified date and time match, it is possible that some network error occurred. The web page is fetched again, step 74, and its new signature re-generated, step 76. The new signature from the re-fetched page is again compared to the older signatures in the history table, test 78. If the signatures still don't match, even though the last-modified dates matched in step 72, then notification is made, step 80, based on the changed signature. When a signature does match, then a network error occurred during the first fetch (step 62) causing a false detect. This false detect is ignored and no change is detected nor notification made, step 79.

This is an improvement over prior-art change-detectors that only look at the last-modified date, since the signatures could be different because dynamic data has changed, such as shown in FIG. 4, although the HTML headers have not indicated a change. It is also an improvement over the parent application, since change-detection is double-checked by the last-modified header and the page re-fetched if needed. Thus false change notifications caused by network errors when fetching the web page can be mitigated.

Figure 9:
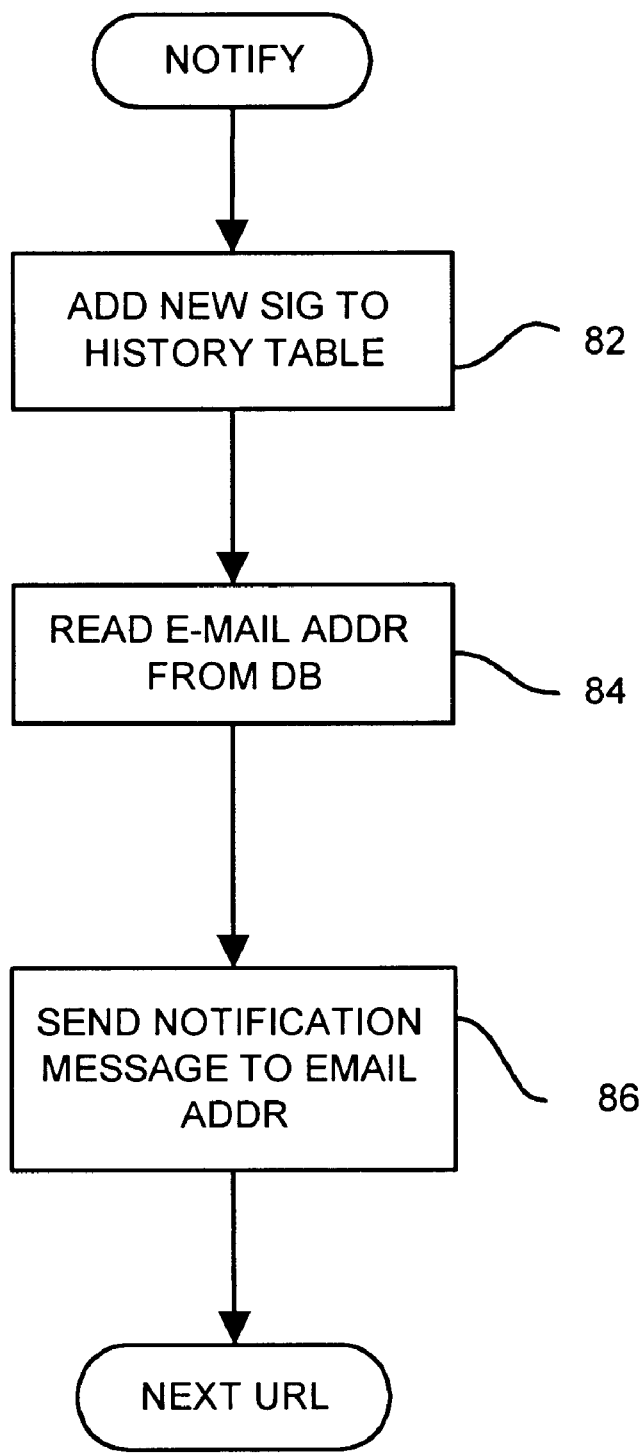
FIG. 9 is a flowchart of notification once a unique change is detected.

Notification—FIG. 9

FIG. 9 is a flowchart of notification once a unique change is detected. Notification step 80 of FIG. 8B updates the history table and generates a message to the user. The new signature is added to the top of the history table, step 82. The other signatures are pushed down the stack, and the oldest signature may have to be deleted. The e-mail address for the user who registered the web page is read from the database, step 84. A notification message is generated and sent to the user's e-mail address, step 86. Then the periodic minder can continue with checking the next URL.

Often more than one user registers a web page. In that case, several e-mail addresses are associated with a single URL record. Messages are generated to each of the users.

Figures 10, 11:
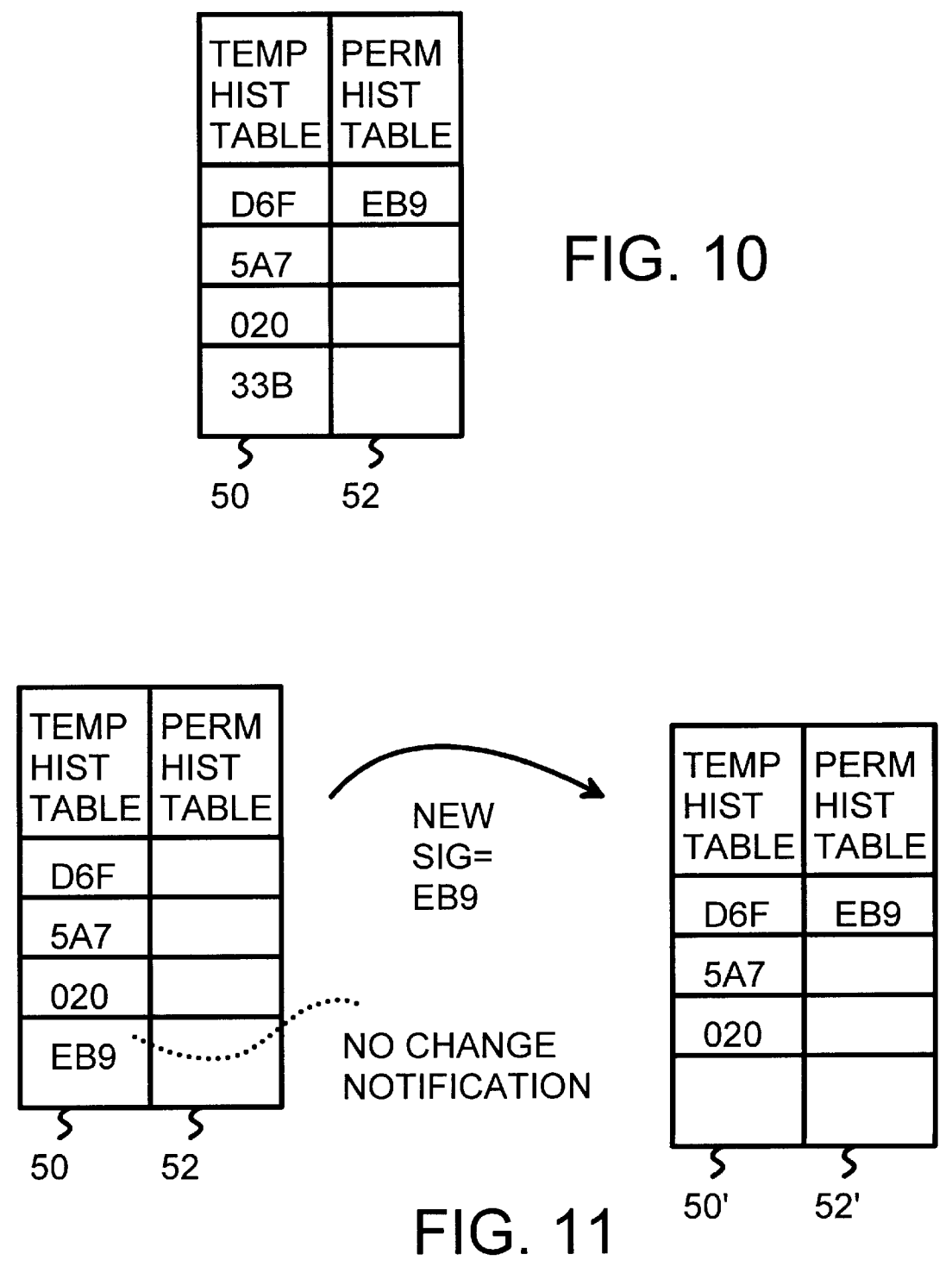

Permanent and Temporary History Tables—FIGS. 10, 11

A refinement to change-detection is to use both a temporary history table and a permanent history table. The history table described earlier for FIGS. 6, 7 is a temporary history table since the oldest signature is deleted to make room for the new signature. In contrast, signatures are not deleted from the permanent history table.

When a new signature of a changed page matches one of the older signatures, it is likely that the new signature is for a frequently-occurring version of the web page, such as for an error page. Frequently-occurring signatures are permanently kept in a separate part of the history table to keep them from being deleted when making room for new signatures.

Of course, the most-recent signature at the top of the stack is frequently matched when the page does not change. It is only matches for other signatures in the history table that are not the current version of the web page that get their signatures moved to the permanent history table. Only non-unique changes are put into the permanent table. Unique changes that do not match any signatures, and identical, unchanged pages that match the most-recent signature in the history table do not alter the permanent history table.

FIG. 10 shows a history table with both temporary and permanent signatures. Temporary history table 50 is a FIFO stack of the most-recent signatures for the registered web page. As a new signature for a changed web page is written to the top of the stack of temporary history table 50, the least-recent signature at the bottom of the stack is deleted to make room. Signature D6F is the most-recent signature while signature 33B is the oldest signature.

Permanent history table 52 contains signatures for web pages that have appeared more than once when a change was detected. For example, signature EB9 is for an error page that appeared a first time, was replaced by another version of the web page, and then appeared a second time. On the first appearance signature EB9 was placed in temporary history table 50, while on the second appearance signature EB was removed from temporary history table 50 and loaded into permanent history table 52. Any future detected changes with a new signature of EB9 do not alter the history tables and avoid notification.

FIG. 11 illustrates how the permanent history table is loaded for detected changes when any of the older signatures in the temporary history table are matched. Signature EB9 is for the error page shown in FIG. 3. This error page was detected earlier and its signature EB9 was loaded into temporary history table 50. After the server came back up from maintenance, the page changed three more times, with signatures 020, 5A7, and D6F being loaded into temporary history table 50. Each of these three signatures was unique and generated a change notification to the user.

During a new change-detection cycle, the error page again appears, and the change-detection tool generates the signature EB9 for the error page retrieved. Signature EB9 is not a unique signature since it has appeared before. The change-detection tool compares the new signature EB9 to all the signatures in both history tables 50, 52, and detects a match with signature EB9 in temporary history table 50. Since a match is found, notification does not occur. Instead, signature EB9 is moved from temporary history table 50 to permanent history table 52'.

In the future, if the error page reappears, a match is detected with its signature in permanent history table 52'. With a single-level history table, the signature for the error page could be bumped off the bottom of the stack after many versions of the web page appeared. The two-level history table of FIGS. 10, 11 allows any number of versions to occur, saving the signature in the permanent part of the history table.

Figure 12:
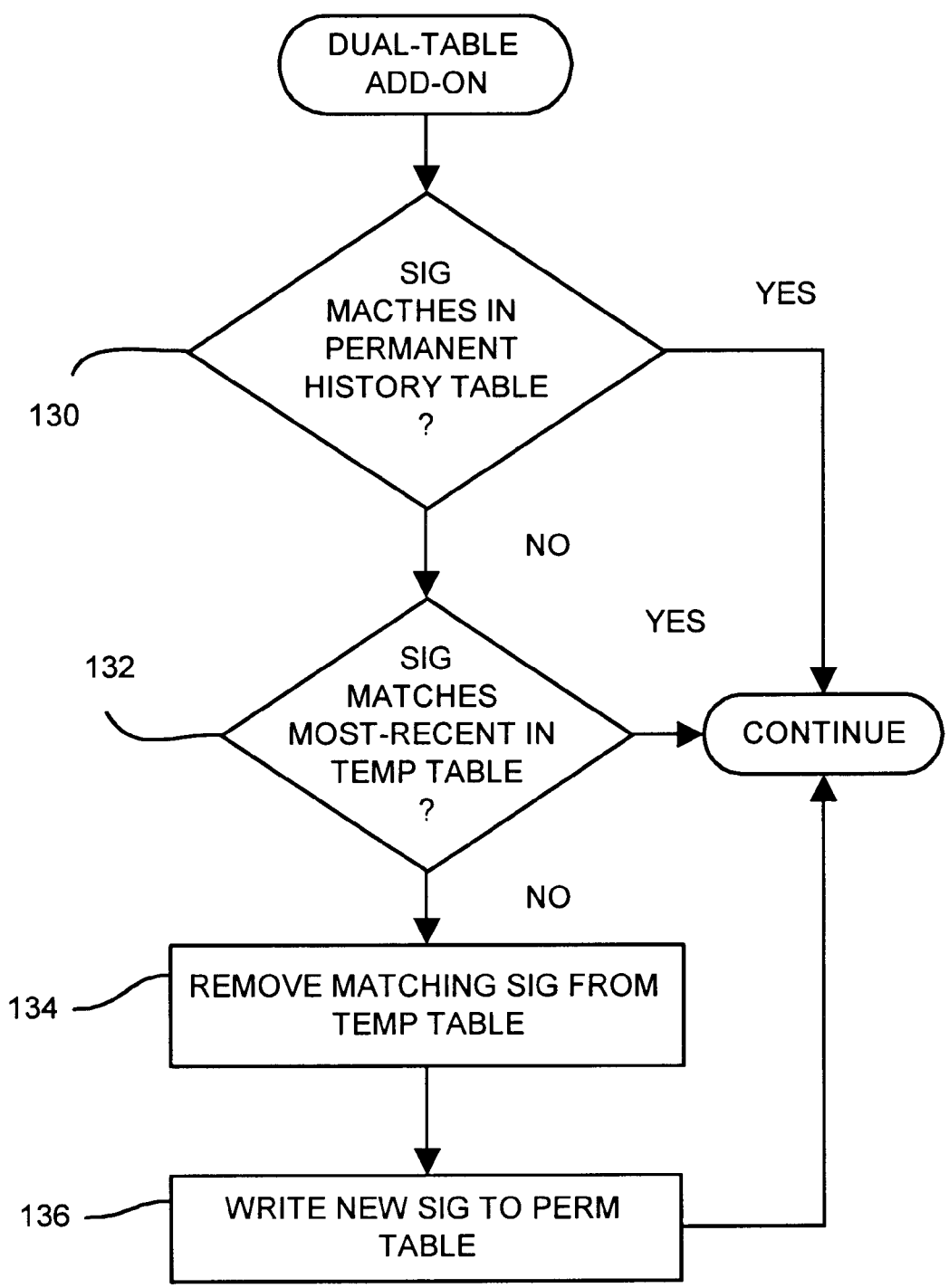
FIG. 12 shows a modification for loading the permanent history table when a non-unique change is detected.

Table-handling Procedure—FIG. 12

Figure 15:
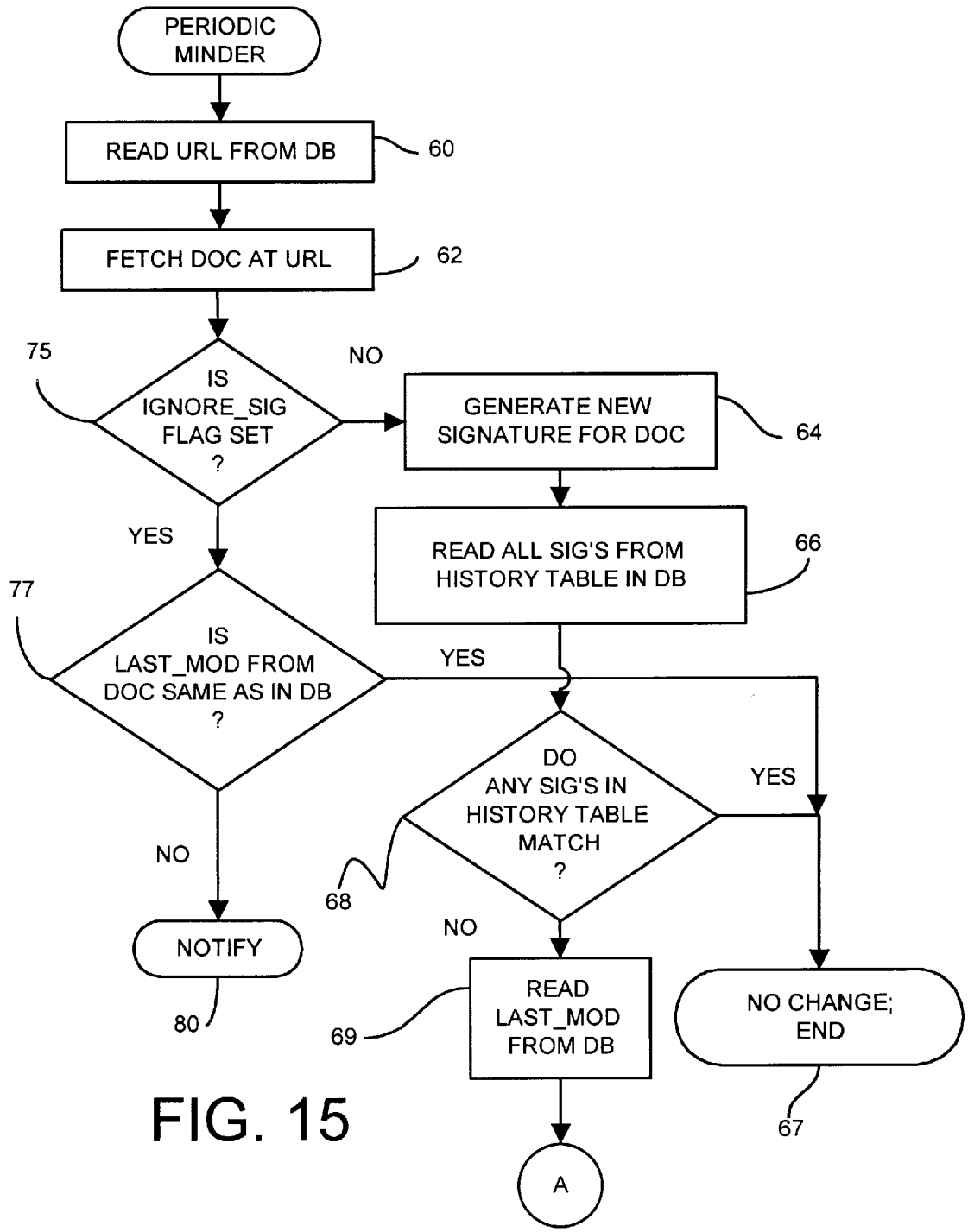
FIG. 15 is a flowchart for change detection that uses signatures and last-modified headers.

FIG. 12 shows a modification for loading the permanent history table when a non-unique change is detected. Step 67 of FIG. 8A and 15 is changed to the procedure in FIG. 12. When a signature match is found in either the permanent or temporary history tables by step 68 (FIG. 8A, 15), then instead of ending and moving to the next URL, the procedure of FIG. 12 is executed.

When the new signature matches a signature already in the permanent history table, step 130, then no unique change is needed and the minder can proceed to the next URL. When the signature matches the most-recent signature at the top of the stack in the temporary history table, step 132, then no change was detected and the minder can continue with then next URL.

When the new signature matches a signature in the temporary history table that is not the most-recent signature, then the tables are altered. The matching signature is removed (step 134) from the temporary history table, which has its remaining signatures shifted or re-ordered to eliminate the bubble formed. The new signature is written to an empty location in the permanent history table, step 136, before the minder continues with then next URL.

When the permanent history table is full, then the software can enlarge the permanent history table. Otherwise, the least-recent permanent signature can be deleted. Since the permanent history table is updated far less frequently than the temporary history table, the least-recent permanent entry is unlikely to be used again.

Figure 14:
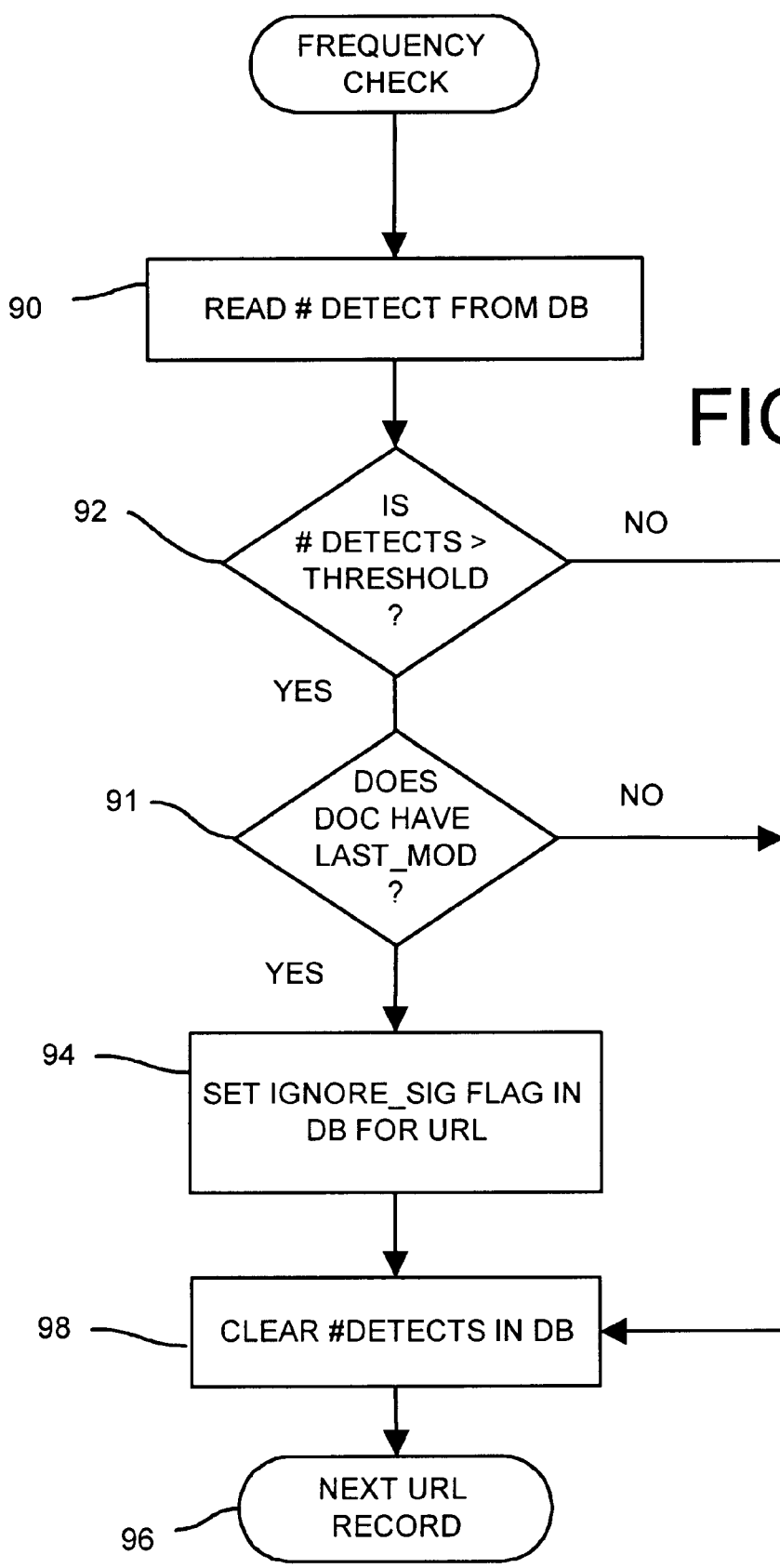
FIG. 14 is a flowchart for a frequency-check routine that stops signature comparison when too many changes are being detected for a web page.

Tracking of Overly-Frequent Change-detection—FIG. 14

If the change-detection software detects changes too frequently, the user is bombarded with notices and soon just ignores them or cancels the service. Change-detection is only useful when it filters down the changes to a small number of significant changes that the user should look at.

Figure 13:
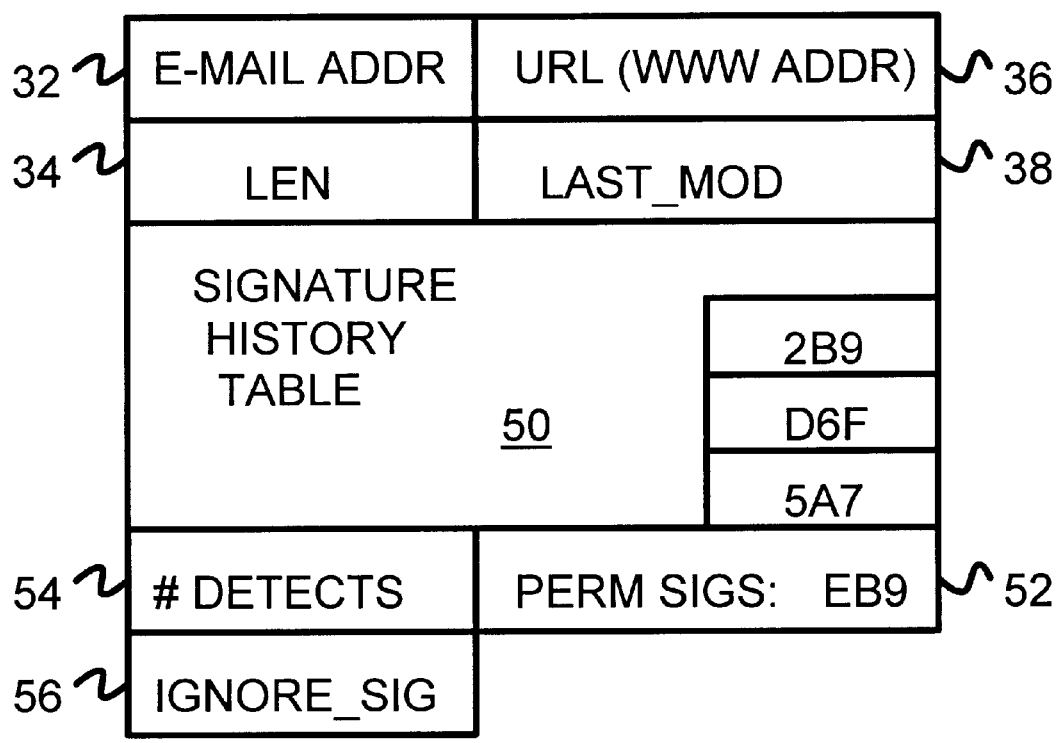
FIG. 13 shows a change-detection record that tracks a number of times that change is detected for a registered web page.

FIG. 13 shows a change-detection record that tracks a number of times that change is detected for a registered web page. Database 16 of FIG. 5 contains many such records, one for each web page or URL. Multiple e-mail addresses can be stored for each web page by using a relational (multi-table) database, with a separate table linking e-mail addresses to registered web pages. Each record has one or more e-mail address 32. When a unique change is detected, a notification message is sent to e-mail address 32.

URL 36 is the world-wide-web address used to locate the web page. Content-length field 34 stores the length of the web page and can be used to ensure that the entire web page has been fetched. Last-modified field 38 contains a copy of the last-modified header returned by the web server for the specific web page. Improved detection results when the last-modified header for the newly-fetched document is compared to last-modified field 38 when signatures mismatch.

Temporary history table 50 contains signatures for the three most-recent versions of the web page. Signature 2B9 (hex) is the most-recent signature for the web page. Temporary history table 50 also stores signature D6F, for the next-to-last version of the web page, and signature 5A7 for the next earlier version of the web page. Thus three signatures for the three most-recent versions of the web page are stored in history table 50. If a newly-fetched web page changes to any of the two earlier versions, a notification is not made, even though a change occurred.

When a change is detected, but the new signature matches one of the older signatures in temporary history table 50, the matching signature is removed from temporary history table 50 and moved to permanent history table 52. Signature EB9, for a recurring error page, is stored in permanent history table 52 as was described for the example of FIG. 11.

Detect-tracker field 54 contains a counter of a number of times change was detected for this web page. Detect-tracker field 54 can be cleared by software on a periodic basis to obtain a count of detections for the period of time since the last clearing. Each time a change is detected and notification sent, detect-tracker field 54 is incremented.

Detect-tracker field 54 is read by a special routine that checks for too-frequently-notified web pages. This routine is shown in FIG. 14. Ignore-signature flag 56 is set by this routine of FIG. 14 when software determines that too many changes are being detected. Once ignore-signature flag 56 is set, signature matches no longer generate change-detection notices. Only the last-modified HTTP header is used.

Frequency Check Routine—FIG. 14

FIG. 14 is a flowchart for a frequency-check routine that stops signature comparison when too many changes are being detected for a web page. Some web pages contain dynamic content that is frequently updated. Sometimes this dynamic content is of interest, such as for the result of a database query. Other times, dynamic content is spurious, such as for rotating advertisements.

Even when dynamic content is of interest, when it is changing daily or weekly, too many change notifications are sent. The user is probably better off reading the web page daily for the changes than using a change-notification service.

When too many change notices are being generated, the software automatically switches the method of change detection to try and reduce the frequency of notifications. When successful, frequent changes in dynamic content can be ignored while change to the underlying static page still generate change notices. The last-modified header can be used for detection rather than signature-matching.

A frequency-check routine is periodically executed for all registered web pages, perhaps once every month or two. Detect-tracker field 54 (FIG. 13) in a record is read, step 90, to get the number of times notifications were sent since the last frequency check. A threshold value is compared to the detect-tracker field, step 92, and if the detect-tracker field is less than the threshold value, an acceptable number of notifications were sent and no changes need to be made. The detect-tracker field is cleared, step 98, and the routine repeats for the next registered web page.

When the detect-tracker field exceeds the threshold value, then too many notifications are being sent to the user. The threshold value is configurable for web pages, perhaps being set to be 2 or 3 notifications for every one or two months, an acceptable number of notifications for an average user. The user may specify how many notifications are acceptable when the page is registered; the user-specified threshold is then stored with the record and used in step 92.

When step 92 determines that the detect-tracker field exceeds the threshold value, then the web page is fetched and the last-modified header is examined. If no last-modified header is found, step 91, then signature-based change detection is left intact, even though many notifications may have been generated.

When a last-modified header is found in step 91, then the ignore-signature flag (56 of FIG. 13) is set in the database, step 94. Future notifications for this web page are only generated when the last-modified header is changed. Since dynamic content usually does not change the page's last-modified header, change notifications are no longer generated for changes in the dynamic content. Only changes to the static page that change the last-modified header generate change notifications. Thus the ignore-signature flag effectively causes changes to dynamic content to be ignored, reducing the frequency of change notifications.

Dual-mode Change-detection—FIG. 15

FIG. 15 is a flowchart for change detection that uses signatures and last-modified headers. The periodic minder (22 of FIG. 5) is modified from the process shown in FIGS. 8A, 8B to ignore signatures when the frequency-check routine of FIG. 14 detects too many notifications. Signature-based notifications can be ignored to reduce the frequency of change notifications to the user.

The URL of the web page is read from the database, step 60, and the page fetched from the Internet, step 62. Test 75 reads the ignore-signature flag (56 of FIG. 13) that may have been set by the frequency-check routine of FIG. 14 when too many notifications are being made. When the ignore-signature flag is not set, the procedure continues at step 64 by generating the new signature and comparing it to the signatures in the history table, step 66. When both a temporary and a permanent history table are present, signatures in both tables are compared and if none match the procedure ends, step 67. Otherwise, the procedure continues with step 69 through the procedure of FIG. 8B described earlier.

When the ignore-signature flag is set, then signatures are not compared. Instead, the last-modified header from the newly fetched document is checked and compared to the last-modified field stored in the database. step 77. If the last-modified dates and times match, then no change is detected and the minder moves on to the next URL, step 67. When the last-modified time or date differ, then a change is detected, and notification is made, step 80, which is shown in detail in FIG. 9.

Thus change detection uses only the last-modified data when too many detections have been made, or both the last-modified date (if present) and signature comparison.

Figure 16:
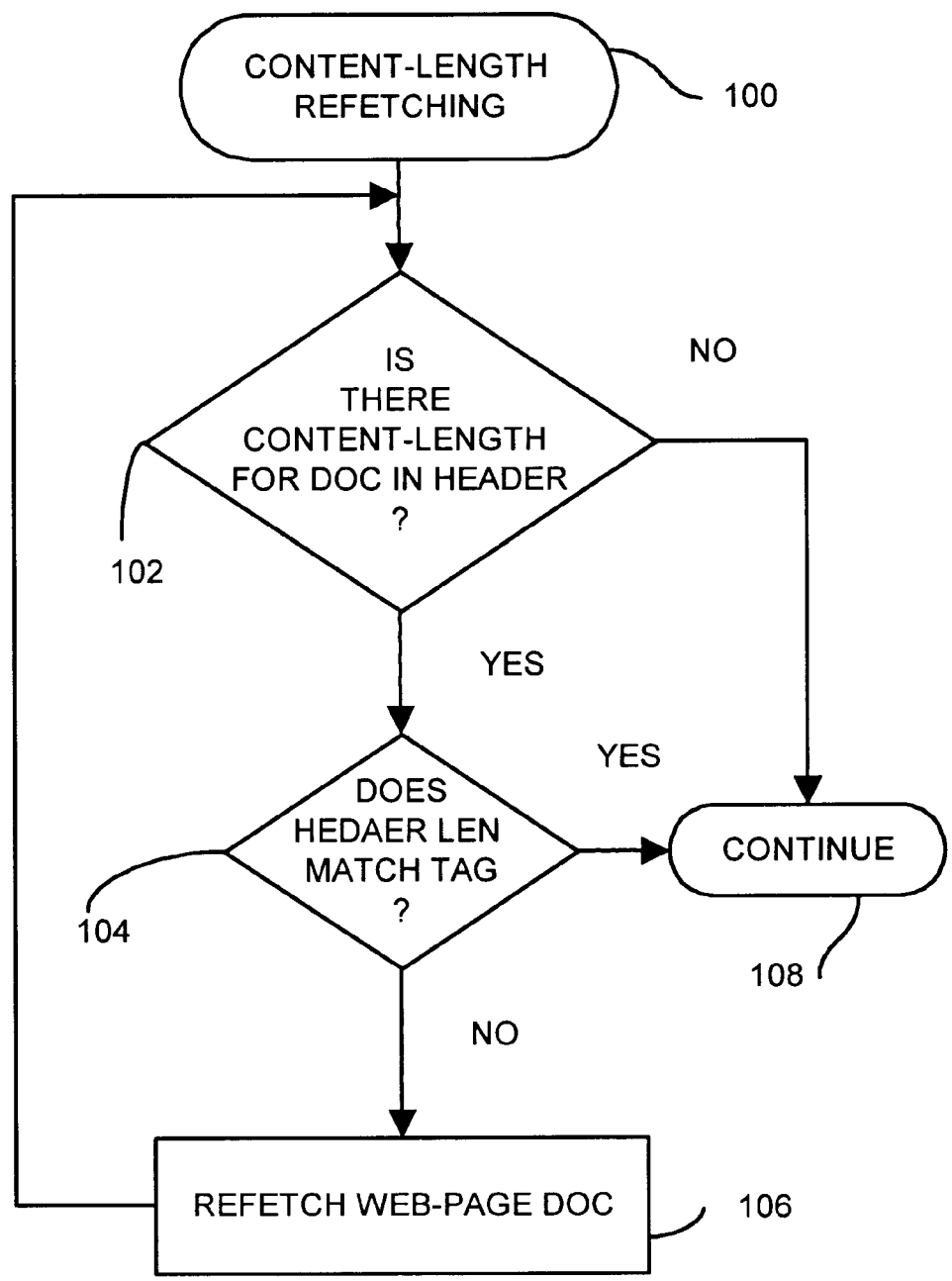
FIG. 16 shows re-fetching when the content length is incorrect.

Content-length Re-Fetching—FIG. 16

Occasionally a network or server error causes only a portion of a web page to be fetched during change detection. A false change can then be detected since the signature for the partial page does not match the signature for the whole page. The content-length header can be used to avoid this problem.

FIG. 16 shows re-fetching when the content length is incorrect. Step 62 of FIGS. 8A, 15 are replaced by the procedure of FIG. 16 when content-length checking is desired.

The web-page document at the URL is fetched, step 100. The Content-Length header is retrieved as a part of the HTTP request that fetches the document. When such a content-length header is found, step 102, then the size of the fetched document is determined and compared, step 104. When the size of the retrieved document does not match the size specified in the content-length header, then only part of the web page was retrieved. The web-page document is re-fetched, step 106, and the process repeated.

When the document's size matches the content-length header, or when no content-length header is present, then the procedures of FIGS. 8A or 15 continues, step 108. Error-handling steps can be added to the basic process to escape from the procedure when the page cannot be returned or after a fixed number of retries the content-length header still does not match the size of the fetched document.

Advantages of the Invention

Web pages monitored by the change-detection tool can be arbitrary documents with different formats. Thus web pages from different companies or groups within the same company, distributed by web servers from different companies off of different platforms can easily be compared automatically by the change-detection tool. Web pages do not have to follow any particular format, nor do they have to be modified for use with the change-detection tool.

The invention reduces the time and effort required by a user wanting to keep abreast of changes at web sites or in any web-enabled information. The change-detection tool automatically discards changing advertisements or dynamic content that cause too many change detections. Since many web pages feature flashy advertising graphics that are frequently changed and even rotated among several different ads or advertisers, the invention can be used to automatically filter out these annoying changes.

The invention can accumulate changes detected and combine them into a single report which is e-mailed to the user each month or other time period. The single report can list all the changes in all the registered documents and even rank the changed document by the number or significance of the values changed.

Power users can even be charged for using advanced features or numeric functions while the general public is allowed to use the basic features free of charge. Thus power users can be charged for the additional storage and computational work required for registering some documents while casual users can freely register documents using the more efficient or less robust settings.

Other web sites can include a brief signup form on their page that their users can use to be notified by e-mail when the content on the page changes significantly. The user selects the signup form and enters his or her e-mail address and submits the form. The user's browser then sends refers the request to the change-detection tool at a different web site. The request contains the user's e-mail address and the URL of the web page. Thus existing web sites can be enhanced to provide update notices to users by including a brief signup form on the page itself. The change detection is handled in the normal way by the change-detection-tool's web site.

The change detection tool reduces bandwidth and other resource utilization on networks, since users no longer use those resources to regularly check documents for relevant changes.

Users use the change detection tool to track the information on a network that they find most important. Because the change detection tool resides on a server, it can be accessed from any web browser that can connect to that server. As a result, users can get access to the information that they have identified as most important from any web browser, whether they are at their desk at work, at home, at a friends house, in a colleague or customer's office, travelling, or in an airport or mall kiosk.

The change detection tool can be used to decrease the total amount of e-mail received by a given user. Since the user is updated on highly specific and relevant information from Web pages the user often finds that subscribing to general-purpose newsletters and mailing lists is no longer necessary.

The change detection tool can eliminate the need for a publisher to re-publish information into multiple formats. Often a web site will hire additional people in order to publish an e-mail newsletter or "push" channels in addition to publishing directly to the Web. When the change detection tool is used, there is no longer any need to republish the information into multiple formats.

The change detection tool can be used by a web publisher or site to gather profile information about users. Users enter specific information into the database of the change detection tool that indicates what is most important to them on the Internet or intranet, how that information is categorized, and what specifically within that information is important enough to check regularly for changes. This profile information can be aggregated for uses in specific domains or groups and used to provide more effective advertising and more effective services for those users. For example, users who have registered to receive updates about baseball-related information can receive sports-related advertisements. If the site also offers search capabilities this information can be used to enhance that search capability. When the example baseball fan enters the word "competition" into a search box the search can automatically be qualified to rank "baseball" and "sports" more highly than, for example, business school papers on the Internet software industry.

Alternate Embodiments

Several other embodiments are contemplated by the inventors. For example the parent application described splitting each web-page document into multiple sections, and storing multiple signatures, one for each section. The current invention can be combined with the parent by storing multiple history tables, one for each section of the document. Each section of the document can be treated as a separate document and notification made if any section has changed.

The invention has been described as for use in the public Internet, but it could also be used by private organizations behind a corporate firewall on an Intranet. Confidential financial data or budgets could be stored as documents on a corporate Intranet, and employees could register the document's URL and thus be notified.

The change-detection tool can be located on a server separate from the web server itself and simply be called by the site's web server. A JAVA applet can be written to be executed by the browser client. This applet performs the functions of the responder, allowing the user to input registration information such as the e-mail address and URL. The document can first be fetched by the applet to the client, allowing the user to select the portions of the document for change-detection. The applet then sends all this information to the change-detection tool web server once the user has finished registration. The applet reduces the loading on the responder, since these functions are performed at the client rather than at the server. The final registration information can then be transferred to the server with the change-detection-tool minder.

The invention has been described as operating on Internet documents. These documents are often complex web pages containing several individual files such as for graphics, text, and motion video and sound. Sometimes these files include small programs such as cgi scripts. Standard world-wide-web pages use the hyper-text-transfer protocol (http), but other protocols can be used in the URL. Gopher and file-transfer-program (ftp) documents can also be registered using their URL's.

Database engines can also be registered as a "document". The registered URL can include the lookup keywords. When the minder checks the URL for changes, the database lookup is re-executed. The results of the lookup are used as the numeric values. Thus the document can be the output from execution of a database lookup or another program. The document can thus be a temporary document or report with dynamic content rather than a static document. Webmasters can insert special headers into their HTML documents to explicitly identify frequently-changing information to ignore on their pages to improve robustness, but this is not necessary for basic operation.

Premium service could check for changes more frequently than once a week or day, perhaps checking every hour or even every few minutes. In addition to standard e-mail, the user can be notified immediately using a pager or personal-digital-assistant (PDA), or using a desktop push technology that continually sends updated Internet information to a user without using a standard browser or e-mail reader.

Change notification can be made for documents moved to another URL, documents that can no longer be found, or re-ordered documents when sections cannot be found. The record for a registration can store URL's and e-mail addresses in separate databases to improve storage efficiency. The URL field in the registration is then an index into the URL database. The e-mail field is likewise an index into the e-mail or users database. Using indexes improves efficiency since an index is used to point to the longer URL's and e-mail addresses. Typically a URL is shared by several users, and an e-mail address is shared by several registrations.

Often the title of an error page reflects the fact that an error has occurred. The change detection tool can send the title as a part of the notification, so that the user knows that this first-occurrence of the error page was the result of a problem with the web server. Combining unique-content notification with the practice of returning the title of the Web page in the notification results in a satisfying end-user experience.

The foregoing description of the embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

We claim:

1. A change-detection web server for detecting unique changes in web pages comprising:

a network connection for transmitting and receiving packets from a remote client and a remote web-page server;

a responder, coupled to the network connection, for communicating with the remote client, the responder registering a web page for change detection by receiving from the remote client a uniform-resource-locator (URL) identifying the web page, the responder fetching the web page from the remote web-page server;

a database, coupled to the responder, for receiving the URL from the responder when the web page is registered by the remote client, the database for storing a plurality of records each containing a URL;

a history table in each of the records in the database, the history table for storing a most-recent signature and a plurality of older-version signatures for a registered web page identified by the URL, the older-version signatures being condensed checksums for earlier versions of the registered web page previously fetched by the change-detection web server, whereas the most-recent signature is a condensed checksum for a most-recently-fetched copy of the registered web page; and a periodic minder, coupled to the database and the network connection, for periodically re-fetching the web page from the remote web-page server by transmitting the URL from the database to the network connection, the periodic minder receiving a fresh copy of the web page from the remote web-page server, the periodic minder generating a new signature from the fresh copy of the web page, the periodic minder notifying the remote client of a unique change when the new signature does not match the most-recent signature and does not match any of the older-version signatures in the record, wherein the unique change in the web page is detected by comparing the new signature to the most-recent signature and to older-version signatures for the web page, wherein changes in the web page which are not unique but match an earlier version of the web page do not notify the remote client.

2. The change-detection web server of claim 1 wherein the database does not store the web page, the database storing the most-recent signature and earlier-version signatures for the web page, whereby storage requirements for the database are reduced by archiving the most-recent signature and not entire web pages.

3. The change-detection web server of claim 2 further comprising:

a permanent history table, the permanent history table for storing new signatures that match one of the older-version signatures, wherein older-version signatures that are matched are copied to the permanent history table.

4. The change-detection web server of claim 3 wherein the history table is a temporary history table organized as a first-in-first-out stack, wherein a least-recent signature in the history table is replaced by a new signature when notification is made, wherein signatures in the permanent history table are not deleted by new signatures written to the temporary history table.

5. The change-detection web server of claim 4 wherein the older-version signatures are stored in both the permanent history table and the history table, the periodic minder comparing the new signature to older-version signatures from both the history table and from the permanent history table.

6. The change-detection web server of claim 2 wherein each record in the database further comprises:

a last-modified field for storing a last-modified date and time contained within the most-recently-fetched copy of the registered web page;

wherein the periodic minder further comprises:

last-modified parsing means, receiving the fresh copy of the web page, for parsing the web page for an HTTP response from the Web server for a last-modified header for indicating a date and time that the web page was last modified;

date compare means, receiving the last-modified header and the last-modified field, for generating a date-match signal before the periodic minder notifies the remote client when the last-modified header from the fresh copy of the web page matches the last-modified field from the database;

wherein the last-modified header is stored in the database for each record.

7. The change-detection web server of claim 6 further comprising:

re-fetch means, responsive to the date-match signal from the date compare means, for fetching another fresh copy of the web page when the last-modified header from the fresh copy of the web page matches the last-modified field from the database but the new signature does not match;

the periodic minder generating a second new signature for the another fresh copy; the periodic minder waiting for the second new signature before notifying the remote client of a unique change when the second new signature does not match the most-recent signature and does not match any of the older-version signatures in the record, wherein the web page is re-fetched before notification when the date-match signal is generated to prevent false notifications due to a network error when fetching the web page.

8. The change-detection web server of claim 7 wherein each record in the database further comprises:

a detect-tracker field for storing a number of notifications sent to the remote client, an ignore-signature flag for indicating when too many notifications were sent to the remote client.

9. The change-detection web server of claim 8 further comprising:

increment means for incrementing the detect-tracker field in the database when notification is sent to the remote client.

10. The change-detection web server of claim 9 further comprising:

frequency check means, responsive to a threshold value, for comparing the detect-tracker field to the threshold value and setting the ignore-signature flag when the detect-tracker field exceeds the threshold value, wherein the ignore-signature flag is set when the number of notifications exceeds the threshold value.

11. The change-detection web server of claim 10 wherein the frequency check means only sets the ignore-signature flag when the web server returns the last-modified header, whereas web pages without a last-modified header cannot have their ignore-signature flags set.

12. The change-detection web server of claim 11 further comprising:

disable means, responsive to the ignore-signature flag, for disabling the periodic minder from comparing signatures, whereas notification is only made when the date-match signal is not generated by the date compare means, wherein the ignore-signature flag disables signature comparison for web pages with a number of notifications that exceeds the threshold value.

13. The change-detection web server of claim 2 wherein the web page is a hyper-text markup-language (HTML) web page containing HTML headers, the HTML headers for indicating formatting, layout, and hyper-links specifying URLs of other servers.

14. The change-detection web server of claim 2 further comprising:

mailer means, coupled to the network connection, for sending a change notification message to the remote client when the unique change is signaled, wherein the responder receives an electronic-mail address from the remote client, the responder storing the electronic-mail address of the remote client in the database, and the mailer means reading the electronic-mail address from the database, the change notification message being sent to the remote client as an electronic-mail message addressed to the electronic-mail address, wherein the remote client is notified of the unique change by electronic mail.

15. The change-detection web server of claim 14 wherein packets transmitted to the network connection are TCP/IP packets and wherein the remote client and the remote web-page server are on the Internet.

16. A computer-implemented method for detecting a unique change in a web page and notifying a user of the unique change, the method comprising the steps of:

registering the web page by:
  receiving an address of the user and a locator for the web page;
  fetching the web page from a remote server by transmitting the locator to a network server;
  generating a signature for the web page;
  storing the signature in a history table for storing signatures for older versions of the web page, and storing the locator, the address of the user in a database;

after a period of time, periodically checking to determine if a unique change has occurred by:
  reading the locator from the database and transmitting the locator to remote server to fetch a recent copy of the web page;
  generating a new signature for the recent copy of the web page;

signaling that a unique change is detected when the new signature does not match any of the signatures in the history table including signatures for the older versions of the web page;

wherein the web page is not stored in the database which stores the history table of signatures for the web page.

17. The computer-implemented method of claim 16 further comprising the step of:

writing the new signature to the history table and deleting a least-recent signature in the history table while retaining other signatures in the history table, wherein the history table is a stack of signatures of recent versions of the web page.

18. A computer-program product comprising:

a computer-usable medium having computer-readable program code means embodied therein for detecting unique changes in a web page, the computer-readable program code means in the computer-program product comprising:

network connection means for transmitting and receiving packets from a remote client and a remote web page server;

responder means, coupled to the network connection means, for communicating with the remote client, the responder means registering web pages for change detection by receiving from the remote client a uniform-resource-locator (URL) identifying the web page;

history-table means for storing a most-recent signature and a plurality of older-version signatures for a registered web page identified by the URL, the older-version signatures being condensed checksums for earlier versions of the registered web page previously fetched for change detection, whereas the most-recent signature is a condensed checksum for a most-recently-fetched copy of the registered web page;

database means, coupled to the responder means, for receiving the URL from the responder means when the web page is registered by the remote client, the database means coupled to the history-table means, the database means for storing a plurality of records each containing a URL and a history table for a registered web page, the database means not storing the web page or the registered web pages, the database means storing condensed signatures for the web page; and periodic minder means, coupled to the database means and the network connection means, for periodically re-fetching the web page from the remote web page server by transmitting the URL from the database means to the network connection means, the periodic minder means receiving a fresh copy of the web page from the remote web page server, the periodic minder means generating a new signature from the fresh copy of the web page, the periodic minder means notifying the remote client of a unique change when the new signature does not match the most-recent signature and does not match any of the older-version signatures in the record, wherein the unique change in the web page is automatically detected by periodically re-fetching the web page, generating the new signature, and comparing to signatures in the history table.

19. The computer-program product of claim 18 wherein the history-table means includes permanent signatures and temporary signatures, wherein when the new signature matches one of the older-version signatures the new signature becomes a permanent signature that is not replaced by other new signatures.

20. The computer-program product of claim 18 wherein the database means stores for each record an actual content-length of the registered web page and a content-length header within the registered web page.

* * * * *